April 24, 1962  J. C. HORNE ET AL  3,031,214
SWIVEL CONNECTING MEANS FOR CONVEYOR UNITS
Filed Nov. 12, 1958
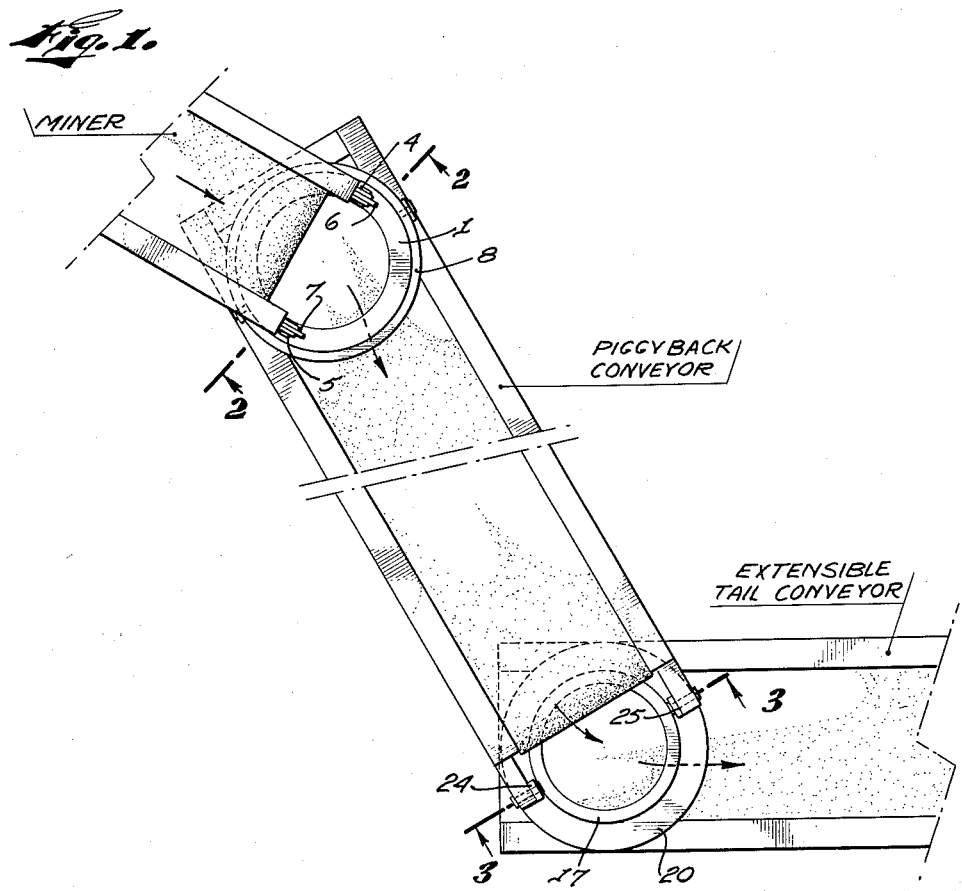
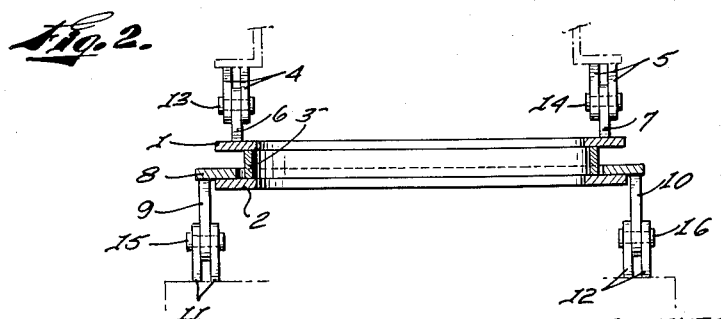
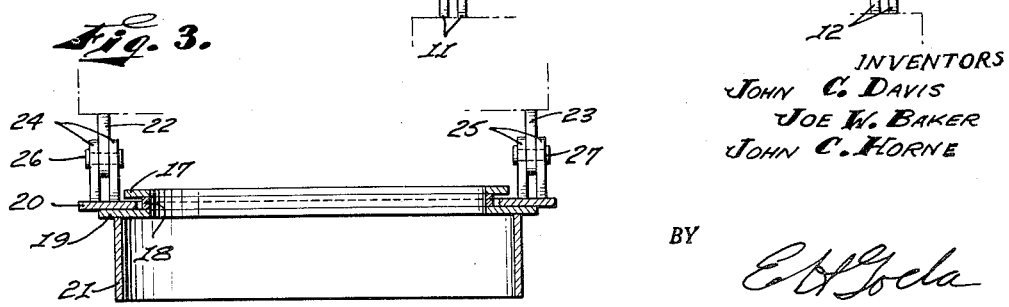
INVENTORS
JOHN C. DAVIS
JOE W. BAKER
JOHN C. HORNE
BY
AGENT

United States Patent Office 3,031,214
Patented Apr. 24, 1962

3,031,214
SWIVEL CONNECTING MEANS FOR
CONVEYOR UNITS
John C. Horne, John C. Davis, and Joe W. Baker, Carlsbad, N. Mex., assignors to United States Borax & Chemical Corporation, Los Angeles, Calif., a corporation of Nevada
Filed Nov. 12, 1958, Ser. No. 773,320
2 Claims. (Cl. 285—274)

This invention relates as indicated to swivel connecting means and more particularly to swivel means for joining heavy equipment which operate in tandem arrangement.

It is therefore the principal object of this invention to provide a freely rotatable swivel connection which is able to withstand the torque effect exerted by heavy machinery connected in tandem.

Other objects will appear as the description proceeds.

To the accomplishment of the foregoing and related ends, said invention then comprises the features hereinafter fully described and particularly pointed out in the claims, the description and the annexed drawings setting forth in detail certain illustrative embodiments of the invention, these being indicative, however, of but a few of the various ways in which the principle of the invention may be employed.

As stated above, the present swivel is particularly advantageous for hitching cooperating units of heavy machinery. A typical example of such machinery is the continuous miner which comprises the miner proper, the piggyback conveyor which trails with the miner and the extensible conveyor tail unit which is connected to the other end of the piggyback conveyor. An apparatus of this type requires two swivel units, one where the piggyback is connected to the miner, and the other where the piggyback is connected to the rear extensible tail unit. Such machinery because of necessity must operate at various difficult angles which exerts a tremendous torque at the point where each unit is connected to the next unit.

In said annexed drawings:

FIG. 1 is a top plan view, partially in section of a continuous mining machine with the swivel connecting means of the present invention;

FIG. 2 is a longitudinal cross-section of the freely rotatable swivel hitch of the present invention; and FIG. 3 is a longitudinal cross-section view of a modification of the present invention.

Either of the swivels can be used alone, or in combination on an apparatus requiring a double hitch, such as the continuous miner of FIG. 1. Referring more specifically to FIG. 2, annular members 1 and 2 having substantially the same inside and outside diameters are separated by annular member 3 having about the same inside diameter as members 1 and 2 and a substantially lesser outside diameter. Rings 1 and 2 are permanently fixed to the top and bottom surfaces of ring 3, as by welding; forming in effect a wheel having a deep groove. Annular member 8, which is disposed between annular members 1 and 2, has an inside diameter sufficiently large so as to be freely rotatable around annular member 3 and an outside diameter sufficiently large so as to extend beyond the outer edges of annular members 1 and 2. Depending upwardly from the top surface of annular member 1 are arm members 6 and 7, which are diametrically disposed and permanently fastened thereto, as by welding. Members 6 and 7 are pivotally connected as at 13 and 14 to upright members 4 and 5, respectively, which in turn are permanently fastened, as by welding, to an apparatus which is to be in tandem connection with a second piece of apparatus. Depending downwardly from the bottom surface of annular member 8 are arm members 9 and 10 which are diametrically disposed and permanently fastened thereto, as by welding. Members 9 and 10 are pivotally connected as at 15 and 16, to depending arm members 11 and 12, respectively. Members 11 and 12 are permanently fastened, as by welding, to the second piece of apparatus. Viewing the combined swivel it now becomes apparent the present swivel can rotate 360° in a horizontal axis while simultaneously the upper and lower portions can rotate 180° in a vertical axis.

In FIG. 3, the principle of the swivel connection is substantially the same as in FIG. 2, except annular member 21 is directly fixed to the one apparatus to be connected in tandem. Here the swivel comprises annular members 17 and 19 separated by annular member 18 and welded together as in FIG. 2 to form a wheel having a deep groove. It will be seen that annular members 17, 18 and 19 have substantially the same inside diameter with annular member 19 having a greater outside diameter than annular member 17. Annular member 20 has an inside diameter sufficiently large to be freely rotatable in the groove formed by annular members 17, 18 and 19; the outside diameter of annular member 17 being sufficient to hold annular member 20 in place and not interfere with paired members 24 and 25. Depending upwardly from the top surface of annular member 20, and fixed thereto as by welding, are diametrically disposed paired arm members 24 and 25. Arm members 22 and 23 are pivotally disposed between paired members 24 and 25 at 26 and 27, respectively. Thus annular members 17, 18, 19 and 21 form a turntable whereby annular member 20 is freely rotatable 360° in a horizontal plane, and arm members 22 and 23 are simultaneously free to rotate 180° in a vertical plane.

As previously stated, we have found our swivel connections to be particularly useful with continuous mining machines which usually comprise the miner proper, the piggyback conveyor and the extensible tail conveyor. Using the swivel of FIG. 2 between the miner and one end of the piggyback conveyor, and the swivel of FIG. 3 between the other end of the piggyback conveyor, we have an apparatus hitched in tandem which can operate around corners and at difficult angles without breaking at the swivel connections.

Other modes of applying the principle of the invention may be employed, change being made as regards the details described, provided the features stated in any of the following claims or the equivalent of such be employed.

We, therefore, particularly point out and distinctly claim as our invention:

1. A freely rotatable swivel for connecting in tandem cooperating units of machinery comprising superimposed first and second annular members joined together by a third annular member disposed between said first and second annular members, each of said annular members having about the same inside diameters and said first and second annular members having substantially greater outside diameters than said third annular member, a fourth annular member having a larger inside diameter than the outside diameter of said third annular member and smaller than the outside diameters of said first and second annular members and having an outside diameter larger than the outside diameter of said first and second annular members, said fourth annular member disposed around said third annular member and between said first and second annular members, said fourth annular member being freely rotatable in a horizontal plane around said third annular member, and said joined first, second and third annular members as a unit being freely and independently rotatable in a horizontal plane within the inside diameter of said fourth annular member, at least one pair of diametrically disposed depending arms affixed to each of the surfaces of said first and fourth annular members respectively, each depending arm provided with pivot means each of said pivot means lying substantially in the same plane whereby said swivel is freely rotatable 180° in a vertical plane.

2. A freely rotatable swivel for connecting in tandem cooperating units of machinery comprising superimposed first and second annular members joined together by a third annular member disposed between said first and second annular members, each of said annular members having about the same inside diameters and said first and second annular members having substantially greater outside diameters than said third annular member, a fourth annular member having a larger inside diameter than the outside diameter of said third annular member and smaller than the outside diameters of said first and second annular members and having an outside diameter larger than the outside diameter of said first and second annular members, said fourth annular member disposed around said third annular member and between said first and second annular members, said fourth annular member being freely rotatable in a horizontal plane around said third annular member, and said joined first, second and third annular members as a unit being freely and independently rotatable in a horizontal plane within the inside diameter of said fourth annular member, a pair of diametrically disposed upwardly depending arm members provided with pivot means affixed to the top surface of said first annular member and a pair of diametrically disposed downwardly depending arm members provided with pivot means affixed to the bottom surface of said fourth annular member each pair of pivot means lying substantially in the same plane whereby said swivel is freely rotatable 180° in a vertical plane.

References Cited in the file of this patent

UNITED STATES PATENTS

| | | |
|---|---|---|
| 1,503,054 | Kuntz | July 29, 1924 |
| 1,729,483 | Koch | Sept. 24, 1929 |
| 1,773,828 | Vermilye | Aug. 26, 1930 |
| 2,360,069 | Marvin | Oct. 10, 1944 |
| 2,514,993 | Ernest | July 11, 1950 |
| 2,694,583 | Zitza et al. | Nov. 16, 1954 |
| 2,750,728 | Bailey | June 19, 1956 |

FOREIGN PATENTS

| | | |
|---|---|---|
| 522,950 | Great Britain | July 2, 1940 |